United States Patent [19]

Hutter

[11] Patent Number: 5,212,213
[45] Date of Patent: May 18, 1993

[54] RADIATION-CURABLE ROSIN-BASED RESINS

[75] Inventor: G. Frederick Hutter, Charleston, S.C.

[73] Assignee: Westvaco Corporation, New York, N.Y.

[21] Appl. No.: 885,842

[22] Filed: May 20, 1992

Related U.S. Application Data

[63] Continuation-in-part of Ser. No. 603,427, Oct. 26, 1990, abandoned.

[51] Int. Cl.$^5$ .............................................. C08F 2/46
[52] U.S. Cl. .................................... 522/81; 522/104; 522/107; 549/233; 525/32.1; 525/39; 528/296; 528/298; 526/264; 526/281
[58] Field of Search .................. 522/81, 104, 107; 260/104; 549/233; 525/32.1, 39

[56] References Cited

U.S. PATENT DOCUMENTS

| | | |
|---|---|---|
| 3,338,850 | 8/1967 | Sbarra et al. |
| 4,076,665 | 2/1978 | Lawson ........................ 522/14 |
| 4,316,835 | 2/1982 | Gardner . |
| 4,643,848 | 2/1987 | Thomas et al. .............. 527/602 |

OTHER PUBLICATIONS

"Rosin and Rosin Derivatives," *Kirk-Othmer Encyclopedia of Chemical Technology*, 2nd Ed., pp. 475-508.

*Primary Examiner*—Marion E. McCamish
*Assistant Examiner*—Mark A. Chapman
*Attorney, Agent, or Firm*—Daniel B. Reece, IV; Terry B. McDaniel; Richard L. Schmalz

[57] ABSTRACT

This invention relates to novel radiation-curable, rosin-based resins and the process for preparing them. In particular, the invention relates to unsaturated polyester resins containing fully fumarated rosin and/or fully maleated rosin which have softening points of at least 80° C. and are capable of being flaked into solid chips; a property that make the resins useful in formulating vehicles for lithographic printing inks and other coating applications.

31 Claims, No Drawings

RADIATION-CURABLE ROSIN-BASED RESINS

FIELD OF INVENTION

This application is a continuation-in-part of my commonly assigned U.S. patent application Ser. No. 07/603,427 filed Oct. 26, 1990 entitled "Radiation-Curable Rosin-Based Resins", now abandoned. This invention relates to novel radiation-curable, rosin-based resins and the process for preparing them. In particular, the invention relates to unsaturated polyester resins containing fumarated rosin and/or maleated rosin which exhibit properties that make them useful in formulating vehicles for lithographic printing inks and other coating applications.

BACKGROUND OF THE INVENTION

It is known in the art to react a polyol and a dibasic carboxylic acid to produce an unsaturated polyester resin. When a simple polyol is utilized to limit the chain extension to only a few units, the products are referred to as oligomers. Diluents are used with these resins to reduce the viscosity of formulation to levels suitable for the required method of coating. These diluents are usually distinct from resins in that they are discrete molecular units. Thus, the diluents are often termed monomers.

A wide range of reactive oligomers have been used as components in radiation (via electron beam or ultraviolet) curable inks and coatings. The majority of these employ acrylic functionality to induce a rapid cure. However, resins with maleic or fumaric functionality have found uses in certain applications such as wood coatings and, to a limited extent, lithographic inks. These resins, while not as reactive as acrylic-functional resins, are less expensive. In appropriate applications, coating formulators will trade a certain amount of cure speed for lower costs.

These lower cost resins are unsaturated polyesters typically produced from a glycol and a dibasic carboxylic acid, most often maleic anhydride. Usually phthalic anhydride or isophthalic acid is added to the polyester to control functionality and to increase hardness. Yet, even with the aromatic acid, these resins remain low-melting solids or semi-solids incapable of being flaked into solid chips. It is recognized in the art that a resin must have a softening point of at least 80° C. in order to be uniformly flaked.

This inability to be flaked requires that the resins be dissolved in monomers and sold as solutions. Monomers play the same rheological adjustment and pigment-wetting role in radiation-curable coatings as do solvents in conventional coatings. Thus, instead of the coatings formulator having one solid resin he can introduce into a number of systems, the formulator is currently required to specify the resin-containing monomer solution or solutions needed for each system.

Therefore, it is the object of this invention to produce a radiation-curable resin that is 100% solid at a temperature of 80° C., and thus is capable of being flaked. The invention would result in a lowering of shipping, handling, and inventory costs for coating and ink producers.

SUMMARY OF THE INVENTION

The object of this invention is met by the use of fully fumarated rosin and/or fully maleated rosin in the radiation-curable resin in lieu of the traditional phthalic anhydride or isophthalic acid. This rosin substitution produces a resin with a higher softening point than was previously attainable. This finding is significant since it allows a 100% solid resin to be produced which is capable of being flaked and utilized in that condition.

FIG. 1 depicts the formation of maleated or fumarated rosin via Diels-Alder adduction.

FIG. 2 depicts the incorporation of maleated rosin into an unsaturated polyester.

DESCRIPTION OF THE PREFERRED EMBODIMENTS

It is well known in the art to react a polyol and a dibasic carboxylic acid to produce an unsaturated polyester resin. Examples of processes for producing these resins are described in U.S. Pat. No. 3,338,850 and in U.S. Pat. No. 4,316,835, both of which are incorporated herein by reference.

Polyols which are suitable for use in the reaction include, but are not limited to, the following:
1,3-butanediol,
1,4-butanediol,
1,4-cyclohexanedimethanol,
diethylene glycol,
ethylene glycol,
propylene glycol,
neopentyl glycol,
glycerol,
trimethylolethane,
trimethylolpropane, and
pentaerythritol.

Dibasic carboxylic acids which are suitable for use in the reaction include, but are not limited to, the following:
isophthalic acid,
phthalic anhydride,
ortho-phthalic acid,
terephthalic acid,
maleic anhydride,
fumaric acid,
azelaic acid,
adipic acid, and
dimer acid.

Diluents which are suitable for use with the resins include, but are not limited to, the following:
2-ethylhexyl acrylate,
hexanediol diacrylate,
n-vinylpyrrolidone,
trimethylolpropane triacrylate,
trimethylolpropane trimethacrytate,
styrene, and
tripropylene glycol diacrylate.

The invention resins are compatible with such common oligomers as urethane acrylates, epoxy acrylates, and the like.

These lists are intended to be representative and it will be obvious to those skilled in the art that a variety of other acids, polyols, diluents, and oligomers can be used. Therefore, other components suitable for use in the reaction can be considered part of this invention when used with the described composition of matter below.

The invention that is useful in raising the softening point of a radiation-curable unsaturated polyester resin to the point where the resin can successfully be flaked is produced by replacing 20% to 80% of the standard dibasic acid with fully maleated rosin, fully fumarated rosin, or a combination thereof. Specifically, the flakable resin is produced by reacting in a fusion reaction: (a) 12 to 68% by weight of a member selected from the group consisting of: fully maleated rosin, fully fumarated rosin, and combinations thereof; (b) 12 to 68% by weight of a member selected from the group consisting of: maleic anhydride, maleic acid, fumaric acid, and combinations thereof; (c) 15 to 40% by weight of a polyol; and (d) up to 20% by weight of a member selected from the group consisting of aromatic dibasic acid and saturated aliphatic dibasic acid.

The invention teaches the use of resins that contain maleic anhydride, maleic acid, and/or fumaric acid far in excess of the amounts that could be accommodated by the rosin via Diels-Alder adduction. This excess is incorporated into the resin via esterification. Maleic anhydride, maleic acid, or fumaric acid that is adducted via the Diels-Alder reaction loses its unsaturation in the process, whereas that which is incorporated by esterification retains its unsaturation. This unsaturation is what makes the application's resins curable.

For example, see FIG. 1. Note that a double bond (A) exists between the two carbonyl groups in the maleic anhydride or fumaric acid; and that these two carbonyl group are joined by single bonds (B) in their respective adducts (maleated or fumarated rosin).

FIG. 2 shows incorporation of maleic anhydride into a resin by esterification, thereby preserving the double bonds (C). A similar incorporation would occur if maleic acid or fumaric acid was substituted for the maleic anhydride.) It is these double bonds that are conjugated with carbonyl groups which are reactive towards styrene or acrylic esters during the radiation curing of the coating.

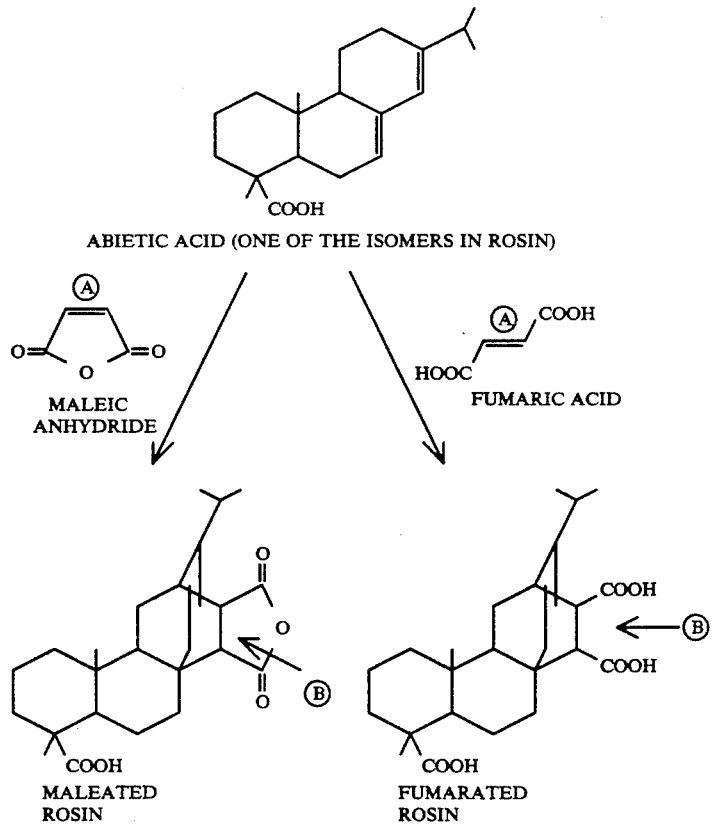

FIG. 1
Formation of Maleated or Fumarated Rosin
via Diels-Alder Adduction

FIG. 2
Incorporation of Maleated Rosin Into an Unsaturated Polyester

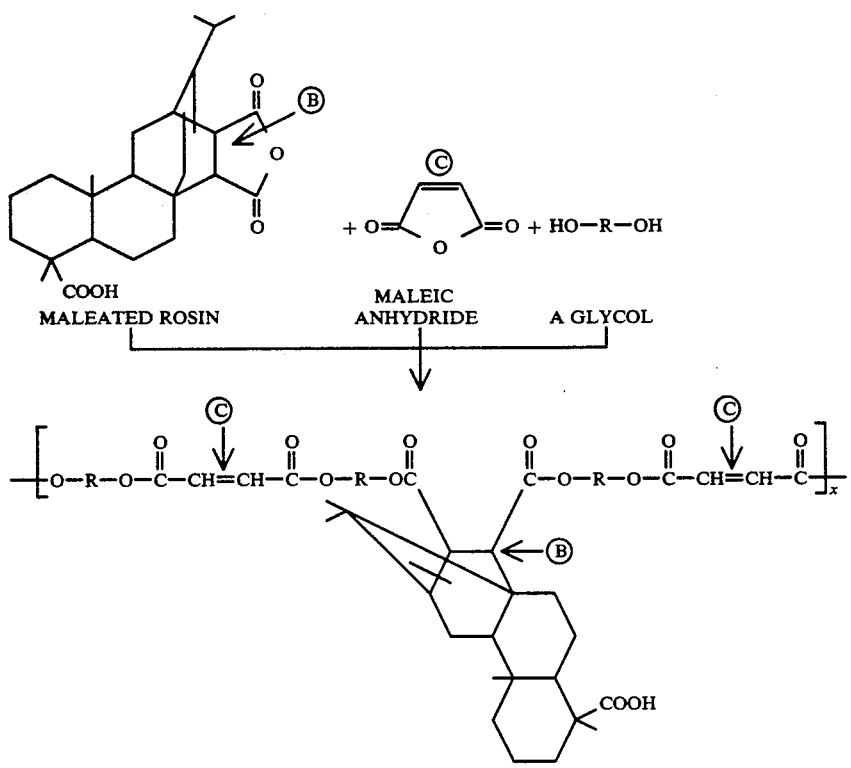

This aspect of the Diels-Alder reaction is well-known to those skilled in the art, as referenced by the article on rosin contained in the KIRK-OTHMER ENCYCLOPEDIA OF CHEMICAL TECHNOLOGY at pages 475–508 (which is hereby incorporated by reference). Although several diterpene acids are found in rosin, levopimaric acid is the isomer that is subject to Diels-Alder adduction due to its cisoid conjugated double bonds. However, other acids (such as palustric, abietic, or neoabietic acids) will isomerize to levopimaric acid at high temperature (ca. 200° C.). These acids are known as PAN acids in the rosin industry. The amount of maleic anhydride, maleic acid, or fumaric acid that will react with the rosin via Diels-Alder adduction is thus determined by its PAN acid content, which can range from 50 mole-% for tall oil rosin to 90 mole-% for some gum rosins.

The tall oil rosin used in the examples below is a Westvaco sidestream rosin which has an equivalent weight per carboxyl group of 312 and a PAN acid content of 50%. Therefore, one equivalent of this rosin (312 parts by weight) should react with 0.5 mole of fumaric acid (58 p.b.w.). Thus, (58/312)×100=18.6 wgt.-% fumarated rosin as specified by the example. Since the reactive capacity of the PAN acids has now been satisfied, any additional fumaric acid that is added to the cook must either not react or react by some other mechanism. When there is a glycol present, that other mechanism will be esterification. Thus, each example cited in the application is fully maleinated or fully fumarated from a Diels-Alder perspective.

As appreciated in the art, the exact components and properties of components desired for any coating application can vary, and, therefore, routine experimentation may be required to determine the optional components and proportions of components for a given application and desired properties.

The following examples are provided to further illustrate the present invention and are not to be construed as limiting the invention in any manner.

EXAMPLE 1

Table I shows the physical properties of three unsaturated polyesters. The first resin was made as a control, and its composition is typical of unsaturated polyesters which are currently being used in the industry. The second and third resins were formulated replacing the phthalic anhydride with, respectively, fully fumarated rosin and fully maleated rosin. The maleic anhydride content was kept constant to maintain constant functionality (i.e. equal moles of reactive unsaturation per unit weight). The modified resins had much higher acid numbers than the control resin due in part to the tertiary carboxyl groups of the maleated or fumarated rosin not esterifying under the polymerization conditions used (200° C.). This high acid number does not interfere with radiation curing.

All resins were prepared by a conventional fusion procedure as illustrated by preparation of the fumarated rosin modified resin. To a 1 L flask fitted with a stirrer, nitrogen sparge tube, and Snyder column was charged 370.0 g of 18.6% fumarated tall oil rosin, 171.5 g of maleic anhydride, 171.0 g of propylene glycol, 0.71 g of phenothiazine, and 0.71 g of dibutyltin oxide. The charge was heated to 200° C. while the temperature at the head of the Snyder column was kept at 100° C. or less to prevent loss of glycol. Heating continued at 200° C. for about five hours to produce a polyester resin. All of the resins were soluble in styrene and various acrylic diluents such as 2-ethylhexyl acrylate, hexanediol diacrylate, and trimethylolpropane triacrylate. The cure speeds of the resins were evaluated by making respective solutions of 60 parts-by-weight of resin, 40 parts of styrene, and 1 part of benzoin isobutyl ether. These UV curable coating solutions were drawn down with a #10 wire-wound rod on Leneta drawdown cards. The cards were placed separately on the conveyer of a lab 6-inch Fusion Systems UV curer (which was set at a speed of 40 feet per minute). The number of passes required to cure to a tack-free state was measured, and recorded in Table I below. All of these polyester resin solutions cured to produce clear, glossy films.

TABLE I

| Resin No. | Composition | S.P. (°C.) | Acid No. | Visc.* | Cure** |
|---|---|---|---|---|---|
| 1 | 23.8 MA | 76 | 16 | L-M | 2 |
|   | 40.6 PG |   |   |   |   |
|   | 35.6 PA |   |   |   |   |
| 2 | 24.1 MA | 94 | 103 | T | 2 |
|   | 24.0 PG |   |   |   |   |
|   | 51.9 FTOR |   |   |   |   |
| 3 | 24.4 MA | 86 | 111 | I | 2 |
|   | 24.3 PG |   |   |   |   |
|   | 51.3 MTOR |   |   |   |   |

*Viscosity 60% in Styrene
**Passes to produce a tack-free cure (see text above)
Key:
FTOR 18.6% Fumarated tall oil rosin
MA Maleic anhydride
MTOR 15.7% Maleated tall oil rosin
PA Phthalic anhydride
PG Propylene glycol Both the fumarated modified resin and the maleated modified resin achieved softening points which are sufficiently high to permit successful flaking.

Solutions of Resin No. 3 from Table I were made in a variety of reactive diluents. Drawdowns were performed with a wire-wound rod as described above and cured on the Fusion Systems curer at a rate of 120 feet per minute. The solutions contained 2% diethoxyacetophenone as a photoinitiator.

TABLE II

| Solution No. | Composition | Cure* |
|---|---|---|
| 1 | 60.0 Rosin resin | 3 |
|   | 30.0 Styrene |   |
|   | 10.0 Hexanediol diacrylate |   |
| 2 | 60.0 Rosin resin | 3 |
|   | 30.0 Styrene |   |
|   | 10.0 Tripropylene glycol diacrylate |   |
| 3 | 60.0 Rosin resin | 3 |
|   | 30.0 Styrene |   |
|   | 10.0 Trimethylolpropane triacrylate |   |
| 4 | 60.0 Rosin resin | 3 |
|   | 30.0 Styrene |   |
|   | 10.0 Pentaerythritol triacrylate |   |
| 5 | 60.0 Rosin resin | 2 |
|   | 30.0 Diethylene glycol diacrylate |   |
|   | 10.0 Tripropylene glycol diacrylate |   |
| 6 | 60.0 Rosin resin | 2 |
|   | 30.0 Diethylene glycol diacrylate |   |
|   | 10.0 Trimethylolpropane triacrylate |   |

*Passes to produce a tack-free cure.

All of these resin solutions cured to produce clear, glossy films.

EXAMPLE 2

Following the procedure outlined in Example 1, a series of resins were produced to evaluate the effects of various glycols on the softening point of the resin. The results are listed in Table II below.

TABLE II

| Resin No. | Composition | Acid No. | S.P. (°C.) |
|---|---|---|---|
| 1 | 47.7 FTOR | 103 | 86 |
|   | 26.2 FA |   |   |
|   | 26.1 1,4-BD |   |   |
| 2 | 47.7 FTOR | 102 | 90 |
|   | 26.2 FA |   |   |
|   | 26.1 1,3-BD |   |   |
| 3 | 51.9 FTOR | 105 | 96 |
|   | 28.5 FA |   |   |
|   | 19.6 EG |   |   |
| 4 | 42.0 FTOR | 103 | 98 |
|   | 23.1 FA |   |   |
|   | 29.5 CHDM |   |   |
|   | 5.4 DEG |   |   |
| 5 | 41.0 FTOR | 108 | 102 |
|   | 22.5 FA |   |   |
|   | 36.5 TMPD |   |   |
| 6 | 49.7 FTOR | 102 | 103 |
|   | 27.3 FA |   |   |
|   | 23.0 PG |   |   |
| 7 | 41.3 FTOR | 100 | 118 |
|   | 22.6 FA |   |   |
|   | 36.1 CHDM |   |   |

Key:
1,3-BD 1,3-butanediol
1,4-BD 1,4-butanediol
CHDM 1,4-cyclohexanedimethanol
DEG Diethylene glycol
EG Ethylene glycol
FA Fumaric acid
FTOR 18.6% Fumarated tall oil rosin
PG Propylene glycol
TMPD Trimethylpentanediol As Table II shows, the more flexible the glycol moiety, the lower the softening point of the resin. The results range from 1,4-butanediol with a four methylene segment at 86° C. up to 1,4-cyclohexane dimethanol with a relatively rigid ring structure at 118° C. However, all the resins would be capable of successful flaking.

EXAMPLE 3

Following the procedure in Example 1, two resins were produced where maleic anhydride was substituted for fumaric acid to evaluate the effect on the softening points of the respective resins. The results are listed in Table III below.

TABLE III

| Resin No. | Composition | Acid No. | S.P. (°C.) | Visc.* |
|---|---|---|---|---|
| 1 | 49.7 FTOR | 102 | 103 | W |
|   | 27.3 FA |   |   |   |
|   | 23.0 PG |   |   |   |
| 2 | 51.3 MTOR | 111 | 86 | I |
|   | 24.4 MA |   |   |   |
|   | 24.3 PG |   |   |   |

*Viscosity 60% in styrene
Key:
FA Fumaric acid
FTOR 18.6% Fumarated tall oil rosin
MA Maleic anhydride
MTOR 15.7% Maleated tall oil rosin
PG Propylene glycol Although both resins achieved softening points which are sufficiently high to allow flaking, the fumarated modified resin has a softening point and a viscosity which are substantially higher than its maleated counterpart.

EXAMPLE 4

Following the procedure outlined in Example 1, two resins were produced where the acid number was varied to evaluate its effect on the softening points of the resins. The results are listed in Table IV below.

TABLE IV

| Resin No. | Composition | Acid No. | S.P. (°C.) |
|---|---|---|---|
| 1 | 51.3 MTOR | 111 | 86 |
|   | 24.4 MA |   |   |
|   | 24.3 PG |   |   |
| 2 | 48.0 MTOR | 126 | 93 |
|   | 29.3 MA |   |   |
|   | 22.7 PG |   |   |

Key:
MA Maleic anhydride
MTOR 15.7% Maleated tall oil rosin
PG Propylene glycol

While both resins achieved softening points sufficiently high to allow for successful flaking to occur, the resin with the higher acid number obtained the higher softening point.

EXAMPLE 5

Following the procedure of Example 1, three resins were produced to evaluate the effect of replacing ethylene glycol with diethylene glycol on the softening points of the resins. The results are listed in Table V below.

TABLE V

| Resin No. | Composition | Acid No. | S.P. (°C.) |
|---|---|---|---|
| 1 | 51.9 FTOR | 105 | 96 |
|   | 28.5 FA |   |   |
|   | 19.6 EG |   |   |
| 2 | 48.6 FTOR | 107 | 70 |
|   | 26.6 FA |   |   |
|   | 15.6 DEG |   |   |
|   | 9.2 EG |   |   |
| 3 | 45.6 FTOR | 99 | 65 |
|   | 25.0 FA |   |   |
|   | 29.4 DEG |   |   |

While the first resin formulated with ethylene glycol achieved a softening point which was capable of being flaked, the resins formulated with diethylene glycol had softening points which were too low to allow for consistent flaking. (For an example of a resin formulated with diethylene glycol that has a softening point over 80° C., see Table II, resin number 4.)

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. Radiation-curable rosin-based resins with a softening point of at least 80° C. comprising reacting in a fusion reaction:
   (a) 12 to 68% by weight of a member selected from the group consisting of: fully maleated rosin, fully fumarated rosin, and combinations thereof;
   (b) 12 to 68% by weight of a member selected from the group consisting of: maleic anhydride, maleic acid, fumaric acid, and combinations thereof;
   (c) 15 to 40% by weight of a polyol; and
   (d) up to 20% by weight of a member selected from the group consisting of aromatic dibasic acid, saturated aliphatic dibasic acid, and combinations thereof.

2. The composition of claim 1 which comprises reacting in a fusion reaction:
   (a) 30 to 60% by weight of a member of the group consisting of: fully maleated rosin, fully fumarated rosin, and combinations thereof;
   (b) 20 to 40% by weight of a member of the group consisting of: maleic anhydride, maleic acid, fumaric acid, and combinations thereof;
   (c) 18 to 35% by weight of a polyol; and
   (d) up to 15% by weight of a member selected from the group consisting of aromatic dibasic acid, saturated aliphatic dibasic acid, and combinations thereof.

3. The composition of claim 1 wherein the temperature of the fusion reaction is maintained between 180° C. and 220° C. until the desired acid number between 70 and 150 is produced.

4. The composition of claim 1 wherein the temperature of the fusion reaction is maintained between 190° C. and 210° C. until the desired acid number between 70 and 150 is produced.

5. The composition of claim 1 wherein the polyol has from 2 to 4 hydroxyl groups.

6. The composition of claim 1 wherein the polyol is selected from the group consisting of 1,3-butanediol, 1,4-butanediol, 1,4-cyclohexanedimethanol, diethylene glycol, ethylene glycol, propylene glycol, neopentyl glycol, glycerol, trimethylolethane, trimethylolpropane, pentaerythritol, and combinations thereof.

7. The composition of claim 1 wherein the dibasic acid is selected from the group consisting of isophthalic acid, phthalic anhydride, ortho-phthalic acid, terephthalic acid, azelaic acid, adipic acid, dimer acid, and combinations thereof.

8. A radiation-curable coating comprising the rosin-based resin of claim 1 dissolved in a reactive diluent selected from the group consisting of 2-ethylhexyl acrylate, hexanediol diacrylate, n-vinylpyrrolidone, styrene, trimethylolpropane triacrylate, trimethylolpropane trimethacrytate, tripropylene glycol diacrylate, and combinations thereof.

9. The radiation-curable coating of claim 8 with a suitable photoinitiator for ultraviolet curing contained therein.

10. The radiation-curable coating of claim 9 with pigment dispersed therein.

11. The radiation-curable coating of claim 8 with pigment dispersed therein.

12. Improved radiation-curable rosin-based resins comprising reacting in a fusion reaction:
   (a) a member of the group consisting of maleic anhydride, fumaric acid, and combinations thereof; and
   (b) a member of the group consisting of: a polyol and combination of polyols; wherein the improvement comprises replacing in said fusion reaction 20% to 80% of the standard dibasic acid with a member selected from the group consisting of fully maleated rosin, fully fumarated rosin, and combinations thereof, to produce resins with softening points of at least 80° C.

13. The composition of claim 12 wherein the temperature of the fusion reaction is maintained between 180° C. and 220° C. until the desired acid number between 70 and 150 is produced.

14. The composition of claim 12 wherein the temperature of the fusion reaction is maintained between 190° C. and 210° C. until the desired acid number between 70 and 150 is produced.

15. The composition of claim 12 wherein the polyol has from 2 to 4 hydroxyl groups.

16. The composition of claim 12 wherein the polyol is selected from the group consisting of 1,3-butanediol, 1,4-butanediol, 1,4-cyclohexanedimethanol, diethylene glycol, ethylene glycol, propylene glycol, neopentyl glycol, glycerol, trimethylolethane, trimethylolpropane, pentaerythritol, and combinations thereof.

17. The composition of claim 12 wherein the dibasic acid is selected from the group consisting of isophthalic acid, phthalic anhydride, orthophthalic acid, terephthalic acid, azelaic acid, adipic acid, dimer acid, and combinations thereof.

18. A radiation-curable coating comprising the rosin-based resin of claim 12 dissolved in a reactive diluent selected from the group consisting of 2-ethylhexyl acrylate, hexanediol diacrylate, n-vinylpyrrolidone, styrene, trimethylolpropane triacrylate, trimethylolpropane trimethacrytate, tripropylene glycol diacrylate, and combinations thereof.

19. The radiation-curable coating of claim 18 with a suitable photoinitiator for ultraviolet curing contained therein.

20. The radiation-curable coating of claim 18 with pigment dispersed therein.

21. The radiation-curable coating of claim 18 with pigment dispersed therein.

22. Improved radiation-curable rosin-based resins comprising reacting in a fusion reaction:
   (a) a member of the group consisting of: maleic anhydride, fumaric acid, and combinations thereof;
   (b) a member of the group consisting of: a polyol, and combination of polyols; and
   (c) a member of the group consisting of: an aromatic dibasic acid, a saturated aliphatic dibasic acid, or combinations thereof; wherein the improvement comprises replacing in the said fusion reaction 20% to 80% of the standard dibasic acid with fully maleated rosin or fully fumarated rosin, or a combination thereof, to produce resins with softening points of at least 80° C.

23. The composition of claim 22 wherein the temperature of the fusion reaction is maintained between 180° C. and 220° C. until the desired acid number between 70 and 150 is produced.

24. The composition of claim 22 wherein the temperature of the fusion reaction is maintained between 190° C. and 210° C. until the desired acid number between 70 and 150 is produced.

25. The composition of claim 22 wherein the polyol has from 2 to 4 hydroxyl groups.

26. The composition of claim 22 wherein the polyol is selected from the group consisting of 1,3-butanediol, 1,4-butanediol, 1,4-cyclohexanedimethanol, diethylene glycol, ethylene glycol, propylene glycol, neopentyl glycol, glycerol, trimethylolethane, trimethylolpropane, pentaerythritol, and combinations thereof.

27. The composition of claim 22 wherein the dibasic acid is selected from the group consisting of isophthalic acid, phthalic anhydride, orthophthalic acid, terephthalic acid, azelaic acid, adipic acid, dimer acid, and combinations thereof.

28. A radiation-curable coating comprising the rosin-based resin of claim 22 dissolved in a reactive diluent selected from the group consisting of 2-ethylhexyl acrylate, hexanediol diacrylate, n-vinylpyrrolidone, styrene, trimethylolpropane triacrylate, trimethylolpropane trimethacrytate, tripropylene glycol diacrylate, and combinations thereof.

29. The radiation-curable coating of claim 28 with a suitable photoinitiator for ultraviolet curing contained therein.

30. The radiation-curable coating of claim 28 with pigment dispersed therein.

31. The radiation-curable coating of claim 28 with pigment dispersed therein.

* * * * *